United States Patent
Malik et al.

(10) Patent No.: US 12,243,297 B2
(45) Date of Patent: Mar. 4, 2025

(54) EXPERT-LEVEL DETECTION OF ACUTE INTRACRANIAL HEMORRHAGE ON HEAD CT SCANS

(71) Applicant: The Regents of the University of California, Oakland, CA (US)

(72) Inventors: Jitendra Malik, Berkeley, CA (US); Pratik Mukherjee, San Francisco, CA (US); Esther L. Yuh, San Francisco, CA (US); Wei-Cheng Kuo, Union City, CA (US); Christian Haene, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 458 days.

(21) Appl. No.: 17/597,714

(22) PCT Filed: Jul. 20, 2020

(86) PCT No.: PCT/US2020/042811
§ 371 (c)(1),
(2) Date: Jan. 19, 2022

(87) PCT Pub. No.: WO2021/016201
PCT Pub. Date: Jan. 28, 2021

(65) Prior Publication Data
US 2022/0254147 A1   Aug. 11, 2022

Related U.S. Application Data

(60) Provisional application No. 62/876,491, filed on Jul. 19, 2019.

(51) Int. Cl.
*G06V 10/82* (2022.01)
*G06T 7/00* (2017.01)
(Continued)

(52) U.S. Cl.
CPC .......... *G06V 10/82* (2022.01); *G06T 7/0012* (2013.01); *G06V 10/764* (2022.01);
(Continued)

(58) Field of Classification Search
CPC .... G06V 10/82; G06V 10/764; G06V 10/774; G06V 2201/031; G06V 2201/03;
(Continued)

(56) References Cited

U.S. PATENT DOCUMENTS

2018/0033144 A1   2/2018   Risman et al.
2018/0365824 A1*  12/2018  Yuh ........................ G06T 7/136
(Continued)

OTHER PUBLICATIONS

Al Idrus, A., "MedyMatch, Samsung add artificial intelligence to stroke diagnosis in ambulances," Fierce Biotech Website, Available Online at https://www.fiercebiotech.com/deals/medymatch-samsung-add-artificial-intelligence-to-stroke-dx-ambulances, Mar. 29, 2017, 5 pages.
(Continued)

*Primary Examiner* — Tom Y Lu
*Assistant Examiner* — Pardis Sohraby
(74) *Attorney, Agent, or Firm* — McCoy Russell LLP

(57) ABSTRACT

A computer-implemented method can include a training phase and a hemorrhage detection phase. The training phase can include: receiving a first plurality of frames from at least one original computed tomography (CT) scan of a target subject, wherein each frame may or may not include a visual indication of a hemorrhage, and further wherein each frame including a visual indication of a hemorrhage has at least one label associated therewith; and using a fully convolutional neural network (FCN) to train a model by determining, for each of the first plurality of frames, whether at least one sub-portion of the frame includes a visual indication of a hemorrhage and classifying the sub-portion of the frame
(Continued)

based on the determining. The hemorrhage detection phase can include: receiving a second plurality of frames from a CT scan of a target subject, wherein each frame may or may not include a visual indication of a hemorrhage; and determining, for each of the second plurality of frames, whether a plurality of sub-portions of the frame includes a visual indication of a hemorrhage based at least in part on the trained model.

15 Claims, 5 Drawing Sheets

(51) Int. Cl.
*G06V 10/764* (2022.01)
*G06V 10/774* (2022.01)

(52) U.S. Cl.
CPC .. *G06V 10/774* (2022.01); *G06T 2207/10081* (2013.01); *G06T 2207/20081* (2013.01); *G06T 2207/20084* (2013.01); *G06T 2207/30016* (2013.01); *G06V 2201/031* (2022.01)

(58) Field of Classification Search
CPC ......... G06T 7/0012; G06T 2207/10081; G06T 2207/20081; G06T 2207/20084; G06T 2207/30016; G06F 18/24133
USPC ......................................................... 382/159
See application file for complete search history.

(56) References Cited

U.S. PATENT DOCUMENTS

| | | | |
|---|---|---|---|
| 2019/0172207 A1* | 6/2019 | Odry | G06V 10/82 |
| 2019/0304092 A1* | 10/2019 | Akselrod-Ballin | G06N 3/084 |
| 2020/0082525 A1* | 3/2020 | Xu | A61B 5/02042 |
| 2020/0349697 A1* | 11/2020 | Gao | G06T 1/0007 |
| 2021/0295108 A1* | 9/2021 | Bar | G06V 10/764 |

OTHER PUBLICATIONS

Solomon, S., "MedyMatch tech for pinpointing brain bleeds gets FDA nod for quick approval," The Times of Israel Website, Available Online at https://www.timesofisrael.com/medymatch-tech-for-pinpointing-brain-bleeds-gets-fda-nod-for-quick-approval/, Jan. 29, 2018, 2 pages.

Pick, A., "Zebra Medical Receives FDA Clearance for its Brain Hemorrhage Alert Technology," C Tech by Calcalist Website, Available Online at https://www.calcalistech.com/ctech/articles/0,7340,L-3764420,00.html, Jun. 17, 2019, 3 pages.

Kuo, W. et al., "Expert-Level Detection of Acute Intracranial Hemorrhage on Head Computed Tomography using Deep Learning," Proceedings of the National Academy of Sciences of the United States of America, vol. 116, No. 45, Nov. 5, 2019, Available as Early as Oct. 21, 2019, 27 pages.

ISA United States Patent and Trademark Office, International Search Report Issued in Application No. PCT/US2020/042811, Oct. 15, 2020, WIPO, 1 page.

\* cited by examiner

EXPERT-LEVEL DETECTION OF ACUTE INTRACRANIAL HEMORRHAGE ON HEAD CT SCANS

CROSS-REFERENCE TO RELATED APPLICATIONS

The present application is a U.S. National Phase of International Patent Application No. PCT/US2020/042811, entitled "EXPERT-LEVEL DETECTION OF ACUTE INTRACRANIAL HEMORRHAGE ON HEAD CT SCANS," filed on Jul. 20, 2020, which claims priority to U.S. Provisional Patent Application No. 62/876,491, entitled "EXPERT-LEVEL DETECTION OF ACUTE INTRACRANIAL HEMORRHAGE ON HEAD CT SCANS," filed Jul. 19, 2019. The entire contents of each of the above-identified applications are hereby incorporated by reference for all purposes.

GOVERNMENT SUPPORT

This invention was made with support under Grant Number 165245 awarded by the Swiss National Science Foundation.

BACKGROUND

Computed tomography (CT) of the human head is the primary medical imaging modality used worldwide to diagnose neurologic emergencies. However, these grayscale images are limited by low signal-to-noise ratio, poor contrast, and a high incidence of image artifacts. Among the various unique challenges presented is to identify, with perfect or near-perfect sensitivity and high specificity, often-tiny subtle abnormalities, e.g., that occupy <100 pixels on noisy images in a large three-dimensional (3D) volume that comprises >$10^6$ pixels.

As such, a need remains for improved detection of acute intracranial hemorrhages on head CT scans.

SUMMARY

Implementations of the disclosed technology are generally directed to systems and methods that include a fully convolutional neural network (FCN) to produce state-of-the-art exam-level classification performance on an independent test set, comparable to that of U.S. board-certified radiologists, in addition to robust localization of abnormalities including some that may be missed by radiologists.

DETAILED DESCRIPTION

Computed tomography (CT) of the human head is used worldwide to diagnose neurologic emergencies such as acute traumatic brain injury (TBI), stroke, and aneurysmal hemorrhage. Evaluation for acute intracranial hemorrhage plays a critical and decisive role in the clinical management of these conditions. It is thus critical for deciding on the need and approach for emergent surgical intervention. It is also essential for allowing the safe administration of thrombolytic therapy in acute ischemic stroke. Since "time is brain," increased speed and reduced error in these clinical settings would constitute life-saving innovations.

Advances in computer vision techniques such as deep learning have demonstrated a tremendous potential for extracting clinically important information from medical images. Examples include the grading of diabetic retinopathy on retinal fundus photographs, the detection of metastases in histologic sections of lymph nodes, and the classification of images of skin cancer, with accuracies comparable to or, in some cases, exceeding that of medical experts.

In contrast to these applications, many radiological imaging studies, such as CT and magnetic resonance imaging (MRI), are "cross-sectional," or three-dimensional (3D) in nature and thus comprised of volumetric stacks of images rather than single images. The 3D nature of such exams presents extra challenges. An additional unusual challenge regarding head CT is the need to identify, with perfect or near-perfect sensitivity, often-tiny subtle abnormalities, e.g., occupying ~100 pixels on noisy, low-contrast images in a large 3D volume that comprises >10 6 pixels. Finally, although perfect sensitivity at exam-level classification is the most crucial goal, concurrent localization of abnormalities on head CT is also important, since physicians will always need to personally visualize and confirm the locations of abnormalities on a head CT exam, in order to judge the need and approach for surgical intervention.

Using a strong pixel-level supervision approach and a relatively small training data set, implementations of the disclosed technology demonstrate an end-to-end network that performs joint classification and segmentation. Such implementations demonstrate the highest classification accuracy to date compared to other deep learning approaches, and also concurrently localizes these abnormalities at the pixel level of granularity. Such implementations demonstrate that they can identify many abnormalities missed by medical experts and achieve up to 100% sensitivity on a held-out test set at an acceptable rate of false-positives. In addition, these implementations demonstrate promising results for multiclass hemorrhage segmentation at the pixel level while preserving accurate detection at the exam level.

Figure 1:
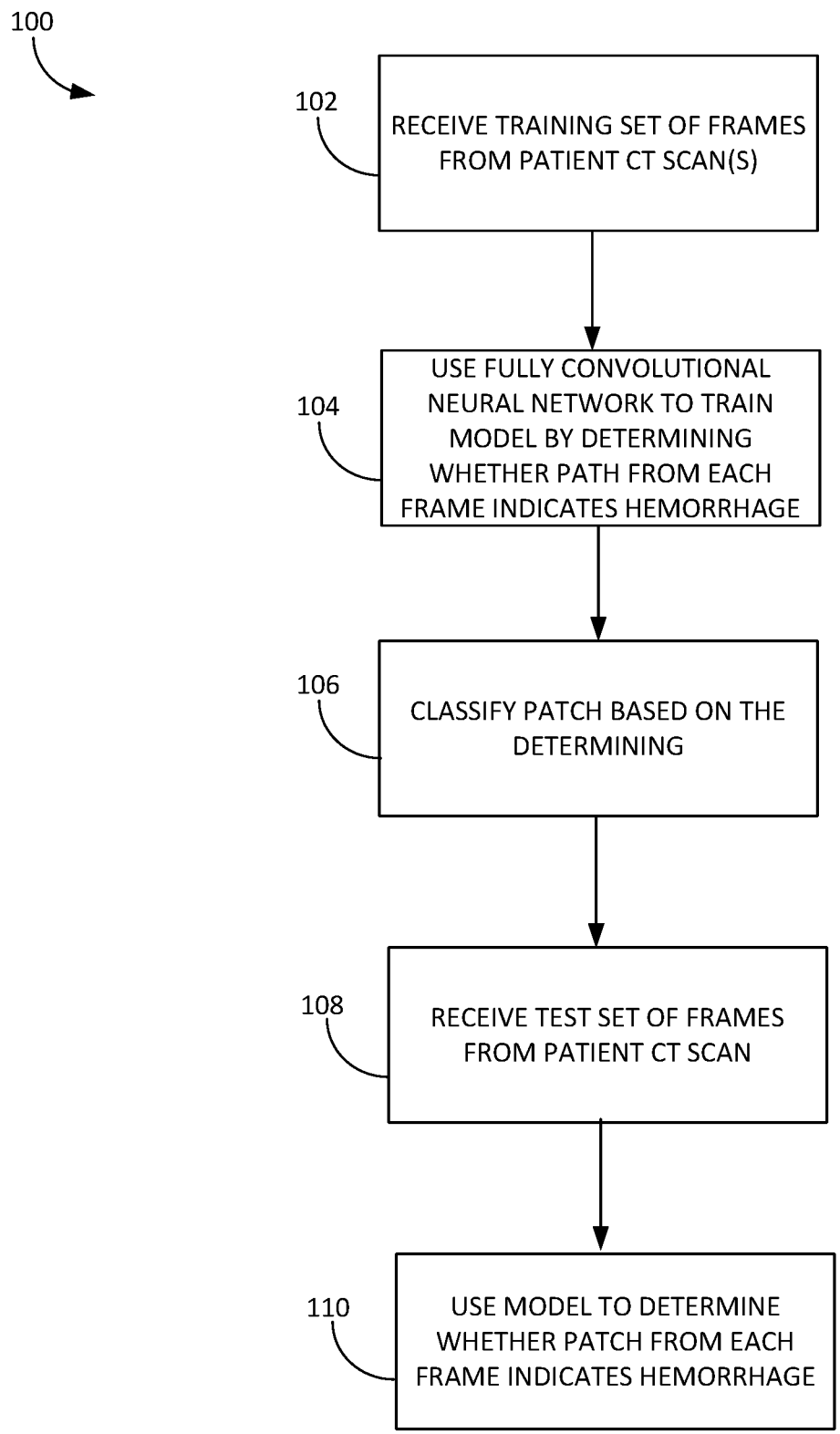
FIG. 1 is a flow diagram illustrating an example of a hemorrhage detection method in accordance with certain implementations of the disclosed technology.

FIG. 1 is a flow diagram illustrating an example of a hemorrhage detection method 100 in accordance with certain implementations of the disclosed technology. In the example, the method 100 includes a training phase and a testing (e.g., brain hemorrhage detection) phase.

The training phase begins at 102, which includes receiving a set of training frames from at least one original computed tomography (CT) scan of a target subject, e.g., a human brain. Each of the training frames may or may not include a visual indication of a hemorrhage, and each frame that includes a visual indication of a hemorrhage has a label associated with it. For the frames that have a label, the label may be a pixel-level label and such frames may each have multiple pixel-level labels.

At 104, a fully convolutional neural network (FCN) is used to train a model by determining, for each of the set of training frames, whether at least one patch (e.g., segment or sub-portion) of the frame includes a visual indication of a hemorrhage. The frames may be segmented to generate the patches, and each patch may have a fixed size such as, for example, 240 pixels by 240 pixels.

At 106, the patch is classified based on the determining. The classifying may include providing a positive or negative indication as to whether a hemorrhage is determined to be present in the patch. Certain embodiments may further include evaluating the trained model by using an institutional set of data that includes a supplemental plurality of frames that each include a visual indication of the presence of a hemorrhage.

The testing phase begins at 108, where a hemorrhage detection module receives a set of frames from a CT scan of a target subject. Each of the frames may or may not include a visual indication of a hemorrhage. Each frame may be segmented to generate multiple patches, and the patches may overlap each other.

At 110, the hemorrhage detection module determines, for each of the set of frames, whether any patch of the frame includes a visual indication of a hemorrhage based on the trained model. Certain embodiments may further include aggregating the determinations that are made for each patch of each frame to generate an exam-level score.

FIGS. 2A-L illustrate examples of a patch-based fully convolutional neural network (PatchFCN) segmentation of acute intracranial hemorrhage. As used herein, the terms patch and segment are synonymous and generally refer to a sub-portion of a frame from a CT scan, e.g., of a human head.

Figure 2:
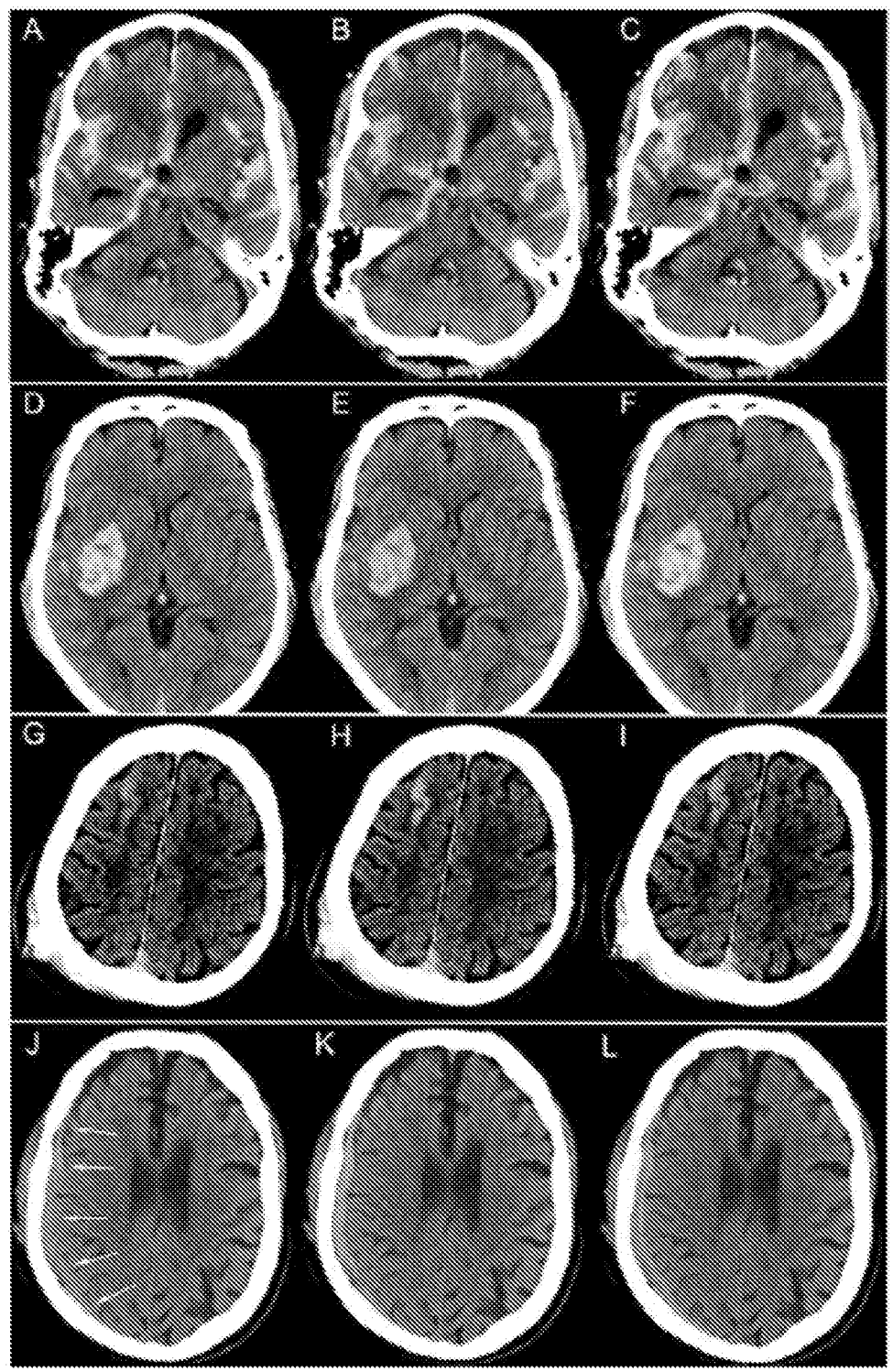
FIGS. 2A-2L are graphical illustrations that demonstrate various examples of localization of acute intracranial hemorrhage in acute aneurysm rupture, hemorrhagic stroke, subacute traumatic brain injury, and acute traumatic brain injury.

FIGS. 2A-L are graphical illustrations demonstrating various examples of PatchFCN localization of acute intracranial hemorrhage in acute aneurysm rupture, hemorrhagic stroke, subacute traumatic brain injury, and acute traumatic brain injury. FIGS. 2J-L show an isodense subdural hemorrhage, and demonstrate that the PatchFCN algorithm may use other more subtle features in addition to hyperdensity relative to brain in order to identify acute hemorrhage.

More particularly, FIGS. 2A-C involve Subarachnoid hemorrhage (SAH) due to aneurysm rupture; FIGS. 2D-F involve Acute intracerebral hemorrhage; FIGS. 2G-I involve Traumatic SAH (missed by one of 4 radiologists); and FIGS. 2J-L involve isodense subdural hematoma (SDH). FIGS. 2J-L may represent either an acute SDH in the setting of coagulopathy, or a subacute SDH at two to several days after injury.

Because isodense subdural hematomas are not brighter than the adjacent brain parenchyma, radiologists identify these by recognizing the absence of sulci and gyri within the isodense collection. In FIGS. 2J-L, the SDH is detected despite its isodensity to gray matter, showing that the deep learning algorithm may use other features in addition to hyperdensity to identify hemorrhage.

FIGS. 2A, D, G, and J are original images, and FIGS. 2B, E, H, and K are original images with red shading of pixel-level probabilities >0.5 (on a scale of 0 to 1) for hemorrhage, as determined by the PatchFCN; pixels with probability <0.5 were unaltered from the original images. FIGS. 2C, F, I, and L are a neuroradiologist's segmentation of hemorrhage using green outline.

Figure 3:
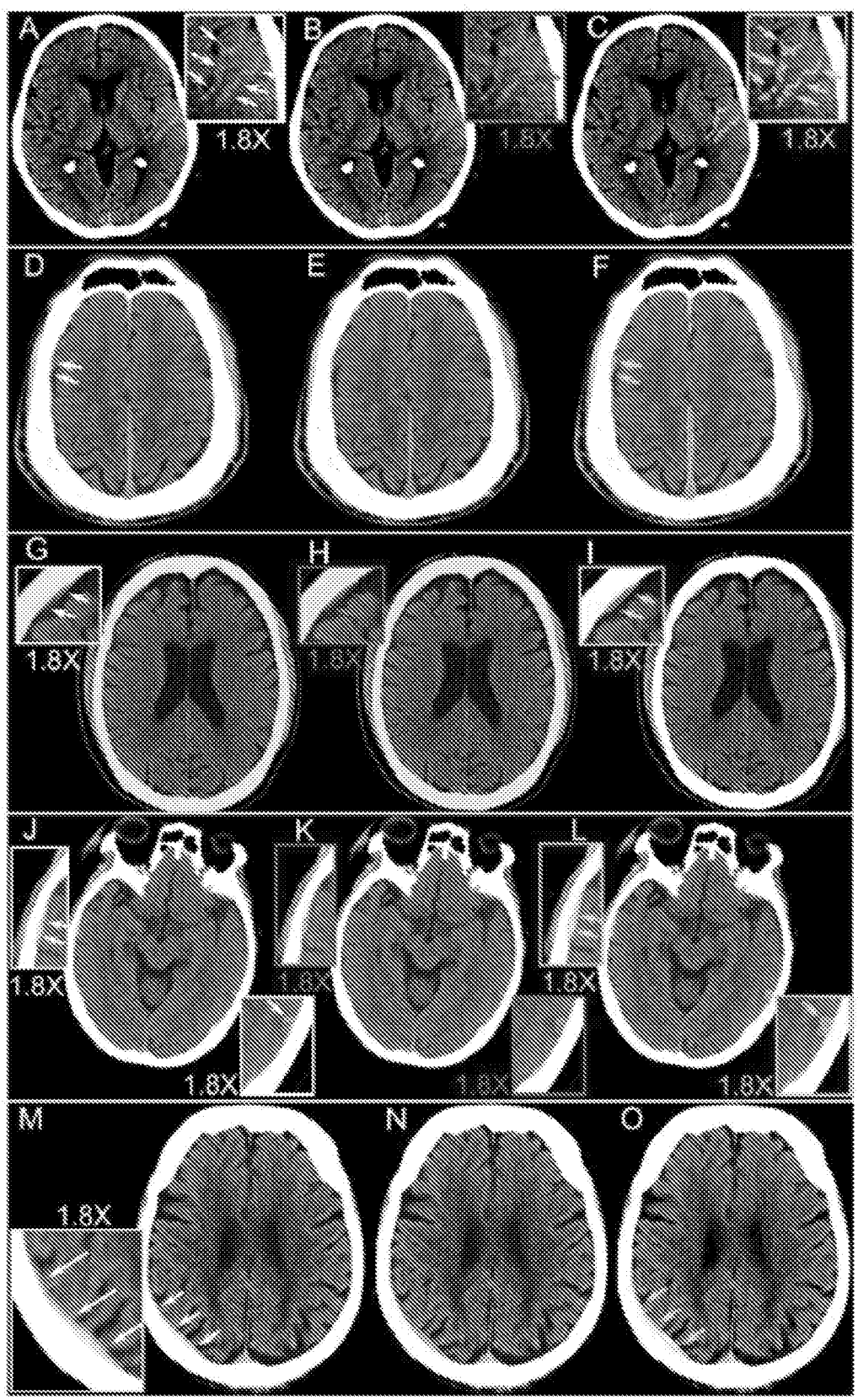
FIGS. 3A-3O are graphical illustrations demonstrating positive cases that were missed by at least two out of four radiologists.

FIGS. 3A-3O are graphical illustrations demonstrating five positive cases in the 200-exam test set that were missed, e.g., judged negative, by at least two out of four radiologists. These cases were positive for acute hemorrhage by both the algorithm and the gold standard.

More particularly, FIGS. 3A-C involve Small left temporal subarachnoid hemorrhage (SAH); FIGS. 3D-F involve small right posterior frontal and parafalcine subdural hematomas (SDH); FIGS. 3G-I involve small right frontal SDH; and FIGS. 3J-L involve small right temporal epidural hematoma and left posterior temporal contusion that were each called negative by 2 of 4 radiologists. In the example, FIGS. 3M-O were called negative by all four radiologists but contained a right parietal SDH identified by both the algorithm and by the gold standard.

FIGS. 3A, D, G, J, and M are original images, FIGS. 3B, E, H, K, and N are an algorithmic delineation of hemorrhage with pixel-level probabilities >0.5 colored in red, and FIGS. 3C, F, I, L, and O are a neuroradiologist segmentation of hemorrhage using a green outline.

Multiclass Exploratory Study

Figure 4:
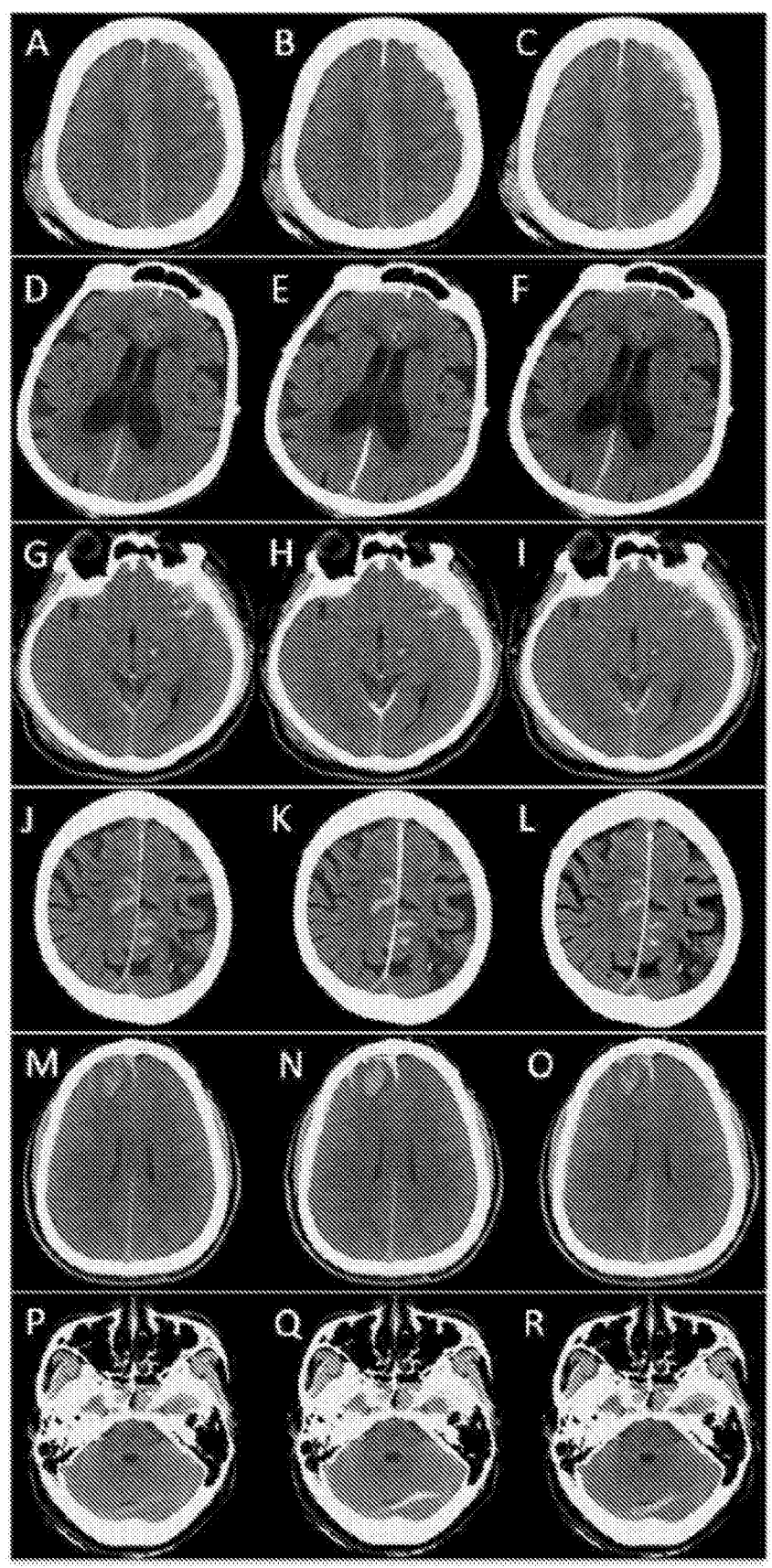
FIGS. 4A-R illustrate various examples of multiclass segmentation by the disclosed algorithm and by an expert.

TABLE 1 below shows that PatchFCN achieves competitive exam-level multiclass detection on an expanded exploratory dataset, while maintaining the strong two-class results on 4-fold cross validation. The results are reported as mean±one standard deviation. It will be noted that the exam-level prediction of each class (including the combined class) is made independently at the output layer, so their results do not depend on each other. FIG. 4 illustrates examples of multiclass segmentation by the algorithm and by a neuroradiologist.

TABLE 1

| Exam-level Multiclass Hemorrhage Detection | | | | | |
|---|---|---|---|---|---|
| Class | 1 | 2 | 3 | 4 | Combined |
| Hemorrhage Types | SDH | EDH | Contusion. ICH, TAI | SAH, IVH | All types |
| AUC of ROC | 0.954 ± 0.010 | 0.940 ± 0.016 | 0.934 ± 0.007 | 0.956 ± 0.006 | 0.982 ± 0.004 |

FIGS. 4A-R illustrate examples of multiclass segmentation by the algorithm and by an expert as follows: FIGS. 4A-C involve left holohemispheric subdural hematoma (SDH, green) and adjacent contusion (purple); FIGS. 4D-F involve right frontal and posterior parafalcine SDHs (green) and anterior interhemispheric subarachnoid hemorrhage (SAH, red); FIGS. 4G-I involve tentorial and left frontotemporal SDH (green) and subjacent contusion (purple) and SAH (red), in addition to shear injury in the left cerebral peduncle (purple); FIGS. 4J-L involve Parafalcine SDH (green) with surrounding SAH (red); FIGS. 4M-O involves Several right frontal SDHs (green) with subjacent contusion (purple) and SAH (red); and FIGS. 4P-R involve small left tentorial and left anterior temporal SDHs (green) and right cerebellopontine angle SAH (red).

FIGS. 4A, D, G, J, M, and P are original images. FIGS. 4B, E, H, K, N, Q are an algorithmic delineation of hemorrhage with pixel-level probabilities >0.5 colored in red (SAH), green (SDH), and contusion/shear injury (purple). FIGS. 4C, F, I, L, O, and R are a neuroradiologist segmentation of hemorrhage.

The disclosed deep learning algorithm has accuracy comparable to that of radiologists for the evaluation of acute intracranial hemorrhage on head CT. Embodiments show that deep learning can accurately identify diverse and very subtle cases of a major class of pathology on this "workhorse" medical imaging modality. Head CT interpretation is regarded as a core skill in radiology training problems, and the performance bar for this application is accordingly high, with the most experienced readers demonstrating sensitivity/specificity between 0.95 and 1.00.

Implementations of the disclosed technology demonstrate the highest accuracy levels to date for this application by using a PatchFCN with strong supervision and a relatively small training data set, compared to prior work relying on weaker supervision using exam- or image-level labels or Mask R-CNN. A fully convolutional neural network (FCN) with pixel-level supervision is well-suited to this application, in which poorly-marginated abnormalities of widely varying sizes and morphologies, such as hemorrhage, need to be both detected and localized. Improving on previous reports, implementations achieve 100% sensitivity for acute hemorrhage detection at 90% specificity, which represents an acceptable rate of false positives for clinical screening purposes.

The disclosed approach is fundamentally different from Mask R-CNN, which treats hemorrhage segmentation as an instance segmentation problem, or detection of discrete objects. Since hemorrhage is fluid ("stuff," e.g., water, sky, grass) and takes on highly variable morphologies often without well-defined boundaries separating discrete objects ("things," e.g. cup, car), semantic segmentation is a simple elegant approach with none of the requirements of object detection and region processing associated with Mask R-CNN.

In addition, motivated by the clinical need to identify and localize, in most cases, a very sparse foreground (e.g., examples of hemorrhage in FIG. 3) with high sensitivity, the best performance with a PatchFCN is informed by just the "right" amount of local information. Specifically, limitation of the network evaluation of each two-dimensional (2D) image on any single pass to a subset or "patch" of the 2D image for modeling x-y-axes context consistently outperformed evaluation of the entire 2D image on pixel and exam-level. A reason for this may be that deeper models with a massive number of free parameters may overfit to less relevant distant information in large input images in the setting of a limited data set size.

Similarly, the current application and data set size that a network informed by three consecutive transverse (i.e., axial) images (image under evaluation, and "flanking" images immediately superior and inferior) was as accurate for pixel and exam-level classification as a network that employed five or more consecutive images, sparing the need for learning even more context with 3D-FCN and avoiding the problem of overfitting to too large a context.

3D-FCN takes in the entire 3D volume, and was demonstrated to achieve accuracy levels exceeding that of human experts for classification of OCT exams. For certain implementations, in which a single small localized area of <100 pixels on a single image may represent the sole abnormality in a 3D volumetric stack comprising approximately 30 images and >10 6 pixels, the theoretical advantage of taking in more global context is outweighed by the advantages of 1) forcing the network to consider an intermediate amount of spatial context, both in-plane and in the craniocaudal direction, and 2) larger batch diversity to stabilize training through the use of batch normalization in deep networks.

The detection of these tiny acute hemorrhages can be of life-saving importance, since an SAH of <100 pixels may be the only evidence of a "sentinel bleed" from a cerebral aneurysm. If the abnormality is missed and the patient is sent home from the Emergency Department without treatment of the underlying aneurysm, he or she is at risk of death or long-term disability when the aneurysm ruptures. Indeed, in half of the cases where the emergency CT scan is interpreted as negative but the patient is later found to have a cerebral aneurysm, the acute hemorrhage is found in retrospect to have been definitely or probably present on the head CT but missed by the radiologist.

Similarly, a tiny EDH that is missed on an emergency CT scan after head trauma has the potential to rapidly expand and kill the patient within hours in the absence of neurosurgical evacuation of the hematoma. While 100% accuracy for acute hemorrhage detection is desirable under these circumstances, unfortunately, the human experts who provide the training for deep learning algorithms are fallible and there is no perfect gold standard for intracranial hemorrhage detection currently available to better train these algorithms. However, by learning from the inputs of multiple human experts, an accuracy level exceeding any single human expert may become feasible.

The disclosed exploratory multiclass results demonstrate higher levels of classification accuracy (93.4% to 95.6%) across the entire spectrum of hemorrhage types than has previously been achieved, and with no loss of overall hemorrhage detection accuracy, despite being performed at pixelwise resolution. These multiclass results also constitute the first prospective demonstration of accurately classifying and segmenting EDHs, which can be difficult to distinguish from SDHs since both represent extra-axial hematomas. This is a crucial distinction, given the clinical importance of accurate early diagnosis of EDH, as discussed above.

To address the need for both accurate exam-level classification and concurrent localization of abnormalities at the pixel level, implementations may use a single-stage network for joint segmentation and exam-level classification, which enjoys the advantages of 1) only one network for both segmentation and exam classification instead of two at both training and test time, and 2) significant feature sharing between segmentation and classification networks. In general, it is beneficial to share the representation between correlated tasks, which saves computation and also serves as an effective regularization method.

Figure 5:
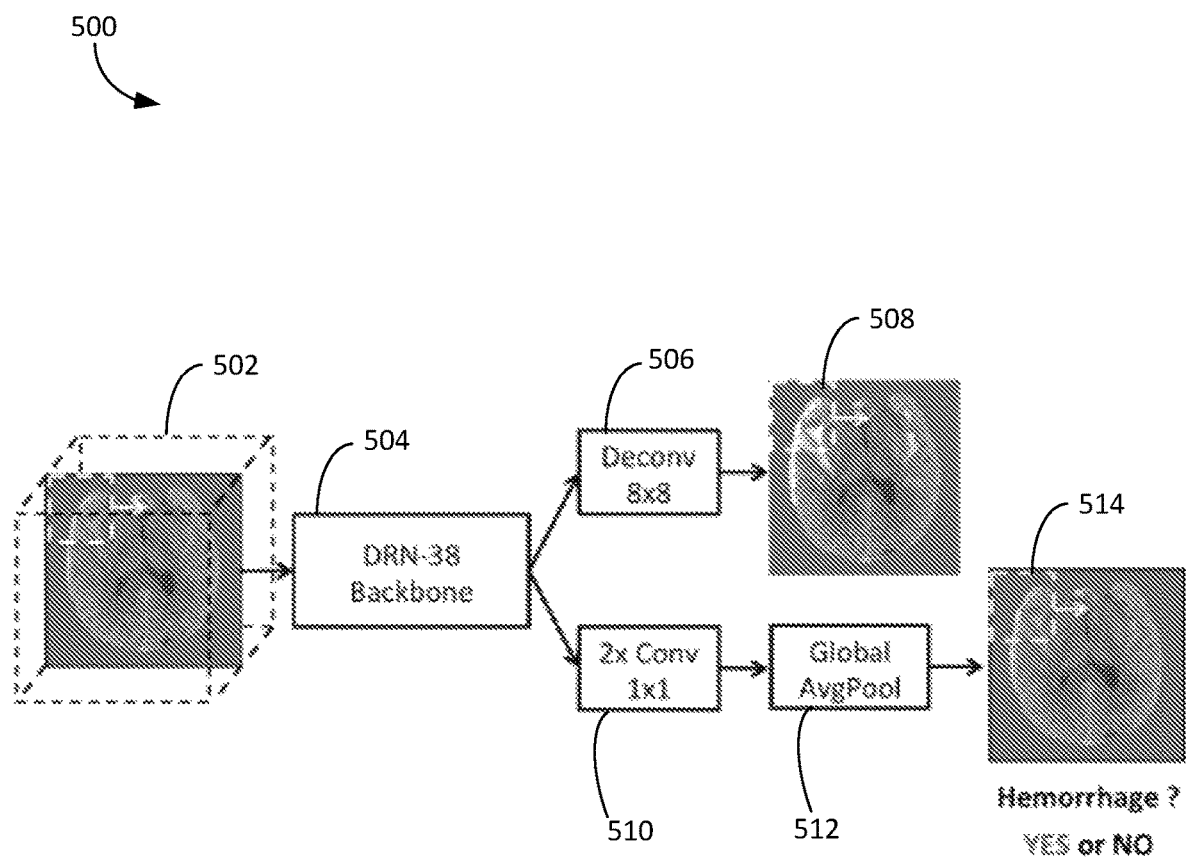
FIG. 5 is a system diagram illustrating an example of a hemorrhage detection system architecture in accordance with certain implementations of the disclosed technology.

FIG. 5 is a system diagram illustrating an example of a hemorrhage detection system architecture 500 in accordance with certain implementations of the disclosed technology. Given a head CT stack 502, the system 500 can evaluate frame by frame in a sliding window style at inference time. The results may be aggregated by averaging at the pixel level (see 508), where the green shows the prediction and red shows the ground truth annotation. Each frame may be stacked with its top and bottom neighbors may go through the DRN-38 backbone 504. At the top pathway, a deconvolution 506 may be applied at the top-level feature to decode the pixelwise prediction. At the bottom pathway, two convolutions 510 may be applied followed by a global average pooling 512 to obtain patchwise classification (see 514). The stack-level score may be given by the maximum of the patch-level scores within the stack.

Implementations of the disclosed technology may demonstrate a deep learning algorithm for detection and localization of acute intracranial hemorrhage on head CT, based on a strong supervision approach and a relatively small training data set. The demonstrated performance is at least comparable to that of highly-trained experts. Beyond the key clinical tasks of classification of head CT exams as positive or negative for abnormalities, PatchFCN will be useful for deriving quantitative biomarkers from CT and other radiological exams. Rudimentary size measurements for intracranial hemorrhage already play a role in practice guidelines for the management of acute hemorrhagic stroke, acute aneurysmal subarachnoid hemorrhage, and acute TBI.

Even these crude measurements are subjective and can be time-consuming to obtain. Improved quantitative information has not been explored due to the impracticality of obtaining these for large datasets, particularly for poorly-marginated ill-defined abnormalities such as subarachnoid and multifocal intracranial hemorrhage, both of which are common in clinical practice. The ability to identify, localize, and quantify features is likely to provide more granular data for research into therapies, prognosis, risk stratification, best treatment practices, and the cost effectiveness of imaging tests.

Deep Learning Algorithm
Network Architecture

Certain implementations include a fully convolutional neural network (FCN) referred to herein as PatchFCN. It is an FCN with modifications selected after exploration of several architectures during the algorithm development phase: (1) to account for context in the craniocaudal direction, it uses three input channels consisting of the "flanking" images immediately superior and inferior to the image under evaluation, in order to simulate radiologists' practice of adjudicating tiny hemorrhages by using contextual information in slices adjacent to the image of interest; (2) to model x-y-axes context, the network evaluation on any single pass is limited to a subset or "patch" of the image, which forces the network to make decisions based on more informative local image information; and (3) to detach the patch prediction from the noisier pixel predictions and to increase patch prediction accuracy, it includes a patch classification branch.

Data Preprocessing

The skull and face were removed from CT images using a series of image processing techniques, including thresholding to identify skull and facial bones, followed by a series of close, open, and fill operations to retain only the intracranial structures. This enhanced privacy of the data, as individuals could in theory be identified through surface rendering of facial soft tissue pixels present in the original data. It also makes the problem easier for the network as it only needs to model the intracranial structures.

Implementation Details

In an example, the network backbone architecture was Dilated ResNet 38 and all hyperparameters were developed on the training set described below. Cross entropy loss was optimized with stochastic gradient descent (SGD) and a momentum of 0.99. The learning rate was decreased by 0.1 every 160 epochs. To control class imbalance, sampled were 30% of the patches from positive images in each training mini-batch and up-weighted the positive pixel loss by a factor of 3. At training time, the backbone and the pixel prediction branch (one up-convolution layer) were trained at an initial learning rate of $10^{-3}$ for 400 epochs. Both of these were then fixed, and the patch classification branch (conv+batchnorm+ReLu+conv layers) was trained for 40 epochs. Finally the entire model was jointly fine-tuned for 30 epochs at a learning rate of $5\times10^{-5}$. At inference time, adjacent patches were sampled at ⅔ overlap with each other. The pixel predictions in each patch were mapped to image space and averaged to yield the final prediction. The stack classification score was taken as the maximum patch classification score in the stack. The model evaluates each stack within one second on average.

Multi-Class Architecture

An exploratory study was conducted on the multiclass prediction of hemorrhage types at the pixel and exam levels. The model output layers are re-designed for the tasks as follows: 1) the pixel classifier has N+1, instead of 2, output channels, where N is the number of hemorrhage classes. 2) The stack classification branch has 2(N+1) outputs for the N hemorrhage classes and the combined positive class. This design is motivated by the observation that the classes are mutually exclusive at the pixel level (i.e., each pixel is a member of only one class, or subtype, of hemorrhage) but not at the exam level (i.e., each exam can contain multiple classes of hemorrhage).

Data Sets
Training Data Set

To develop the algorithm, a training set composed of 4,396 head CT scans performed at a university and affiliated hospitals was used (see Table 1). This data set consists of 1,131 exams positive for intracranial hemorrhage and 3,265 negative exams. The training dataset had a wide spectrum of sizes and types of hemorrhage as well as of imaging artifacts, and was collected from 4 different CT scanners from two major CT vendors from 2010-2017. Each exam consisted of a 3D stack of 27-38 transverse 2D images through the head acquired on 64-detector-row CT scanners. Pixel-wise labels for acute intracranial hemorrhage were verified by two ABR certified radiologists with CAQ in Neuroradiology.

Test Data Set

To validate the algorithm, a separate test set of 200 head CT scans performed at the same hospitals in November-December 2017 was collected (see Table 2). In formulating the test set, the system aimed for an overall 10 to 15% positive rate for acute intracranial hemorrhage that approaches the positive head CT rate in many busy acute-care hospitals. The algorithm was to be evaluated on the initial head CT exam only, and to exclude follow-up head CT exams performed during the same hospitalization following neurosurgical interventions such as hemicraniectomy or craniotomy. Included within the test set is a substantial number of positive exams that would include a diverse spectrum of possible intracranial hemorrhage patterns, while maintaining an overall low positive head CT rate that would simulate observed rates in current clinical practice.

The overall test set size needed to be controlled such that each adjudicating radiologist could interpret the entire set of 200 head CT exams within a total of 5 days when working at an average clinical pace. Also, selection bias was to be minimized in the process of selecting cases for the test set. To accomplish these goals for the test set, the following approach was used: the exams were identified from the Radiology Information System (RIS) Structured Query Language (SQL) database and, using the RIS, 150 head CT exams ordered from November to December 2018 were randomly selected that excluded reference to a prior craniectomy or craniotomy; and for which no prior or follow-up head CT exam was found for that patient during the same hospitalization. Also randomly selected were 50 head CT exams with no reference to prior craniectomy or craniotomy, and no prior head CT exam during the same hospitalization, but with at least one follow-up head CT scan performed during the same hospitalization.

Since most CT scans with no follow-up CT scan during the same hospitalization are negative for an acute intracranial abnormality, while many (but not all) CT scans with at least one follow-up CT scan performed during the same hospitalization contain a significant acute intracranial finding, it was estimated that this strategy would yield an overall 10 to 15% proportion of positive head CT exams for acute intracranial hemorrhage, while avoiding the need to view the actual images. Using this approach, the actual test set of 200 exams contained 25 positive and 175 negative exams for acute intracranial hemorrhage, for an overall 12.5% positive rate that approximates the observed positive head CT rate in many hospitals. The skull stripping algorithm failed on one head CT exam, which was replaced by another exam from the same time period using the same approach. The test set did contain a larger proportion of CT exams compared to the CT vendor distribution in the training data set, owing to the larger number of head CT exams performed on certain CT scanners as part of the acute head CT workflow in place at a hospital during the November-December 2017 time period.

TABLE 2

Training and test data sets

|  | CT Manufacturer | Number of Acute intracranial exams | hemorrhage | Number of exams |
|---|---|---|---|---|
| Training | GE | 1589 | Positive | 1131 |
|  | Siemens | 2807 | Negative | 3265 |
| Test | GE | 14 | Positive | 25 |
|  | Siemens | 186 | Negative | 175 |

Multiclass Data

To explore the potential of PatchFCN in a multiclass setting, an expanded set of multiclass hemorrhage data that comprises of 4766 scans from different scanners was collected. The exams are conducted and labeled following the same protocol as described earlier. Each pixel was labeled with its hemorrhage type label. The hemorrhage classes are defined by clinical criteria as shown in TABLE 3 below. The pixel and exam ratios of each class indicate the proportion of positive pixels/exams with the class of hemorrhage present. Note that the positive-class pixels are extremely rare compared to the negatives. The scarcity of foreground pixels in conjunction with low-contrast noisy images makes both pixel and exam-level prediction challenging.

TABLE 3

Multiclass Exploratory Data

| Class | 0 | 1 | 2 | 3 | 4 |
|---|---|---|---|---|---|
| Hemorrhage Types | None | SDH | EDH | Contusion, ICH, TAI | SAH, IVH |
| Pixel Ratio | 0.996 | $3.5 \times 10^{-3}$ | $3.2 \times 10^{-4}$ | $2.2 \times 10^{-5}$ | $7.1 \times 10^{-4}$ |
| Exam Ratio | 0.686 | 0.196 | 0.026 | 0.152 | 0.232 |

In TABLE 3, SDH refers to subdural hematoma, EDH refers to epidural hematoma, ICH refers to intracerebral hematoma, TAI refers to traumatic axonal injury, SAH refers to subarachnoid hemorrhage, and IVH refers to intraventricular hemorrhage.

Evaluation of Model Performance

To evaluate model performance, the deep learning algorithm was executed exactly once on the test set of 200 CT exams, with no adjustment of hyperparameters that had been selected during the algorithm development phase. This excluded the possibility of any overfitting to the test data, so that the reported performance should match the model's true performance very well. For each scan in the test dataset consisting of 200 CT exams, the algorithm indicates both pixel-level and exam-level probabilities (continuous from 0 to 1) for the presence of intracranial hemorrhage. Although some patients underwent two or more head CT exams during the same hospitalization, it was ensured that each patient appeared at most once in either the training set or the test set, but not in both.

The ROC was calculated for the deep learning algorithm to identify the presence of acute intracranial hemorrhage on each CT exam, compared to the "gold standard." The gold standard for interpretation of CT scans in the test set as positive or negative for acute intracranial hemorrhage consisted of a careful consensus interpretation by two ABR certified neuroradiologists with CAQ in neuroradiology, one with 15 years and the other with 10 years of attending-level experience in interpretation of head CT exams.

Comparison to Radiologists

Four ABR-certified practicing radiologists each reviewed the 200 CT exams in the test set. One radiologist had 2 years of subspecialty fellowship training and a CAQ in neuroradiology, with 15 years of attending neuroradiologist experience. The others had 4, 10, and 16 years of experience in private and/or academic general radiology practice, including interpretation of head CT. These radiologists were asked to indicate whether each scan was more likely positive or more likely negative for acute intracranial hemorrhage, a binary decision, in contrast to the continuous probability for hemorrhage provided for each exam by the algorithm. The radiologists' time to evaluate each scan was not limited.

The radiologists were instructed to interpret all CT scans carefully, using conventions, such as the duration of time spent on each scan, and level of care in interpreting each scan, that would be consistent with U.S. standard-of-care clinical practice. The radiologists were able to return to prior CT scans and to modify their interpretations of exams they had seen earlier in the data set. The radiologists were not aware of the overall ratio of positive to negative CT exams. The sensitivity and specificity of each radiologist was calculated to detect whether or not there was acute intracranial hemorrhage on each CT exam, compared to the gold standard.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc.

As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

Consequently, in view of the wide variety of permutations to the embodiments that are described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A computer-implemented method, comprising:
   during a training phase:
   receiving a first plurality of frames from at least one original computed tomography (CT) scan of a target subject, wherein each frame may or may not include a visual indication of a hemorrhage, and further wherein each frame including a visual indication of a hemorrhage has at least one label associated therewith; and
   using a fully convolutional neural network (FCN) to train a model by determining, for each of the first plurality of frames, whether at least one sub-portion of the frame includes a visual indication of a hemorrhage and classifying the sub-portion of the frame based on the determining,
   wherein the training phase includes:
   using three input channels including "flanking" images that are immediately superior and inferior to each frame during evaluation to simulate radiologists' practice of adjudicating tiny hemorrhages by using contextual information in slices adjacent to the image of interest;
   modeling x-y axes context by limiting network evaluation on any single pass to a subset or "patch" of the image, which forces the network to make decisions based on more informative local image information; and
   a patch classification branch to detach a patch prediction from noisier pixel predictions and to increase patch prediction accuracy; and
   during a hemorrhage detection phase:
   the hemorrhage detection module receiving a second plurality of frames from a CT scan of a target subject, wherein each frame may or may not include a visual indication of a hemorrhage; and
   the hemorrhage detection module determining, for each of the second plurality of frames, whether a plurality of sub-portions of the frame includes a visual indication of a hemorrhage based at least in part on the trained model.

2. The computer-implemented method of claim 1, wherein the training phase further includes, for each of the first plurality of frames, segmenting the frame to generate the at least one sub-portion of the frame.

3. The computer-implemented method of claim 1, wherein each sub-portion for each of the first plurality of frames has a fixed size.

4. The computer-implemented method of claim 3, wherein the fixed size is 240 pixels by 240 pixels.

5. The computer-implemented method of claim 1, wherein the label for each frame that includes a visual indication of a hemorrhage is a pixel-level label.

6. The computer-implemented method of claim 1, wherein some of the sub-portions of the first plurality of frames overlap each other.

7. The computer-implemented method of claim 1, wherein classifying each sub-portion of each frame includes providing a positive or negative indication.

8. The computer-implemented method of claim 1, further comprising, during the hemorrhage detection phase, aggregating the determinations for each sub-portion of each frame to generate an exam-level score.

9. The computer-implemented method of claim 1, wherein the training phase further includes applying deconvolution at a top-level feature in each frame to decode pixelwise prediction.

10. The computer-implemented method of claim 1, wherein the target subject is a human brain.

11. The computer-implemented method of claim 10, wherein the hemorrhage in each CT scan is a brain hemorrhage.

12. The computer-implemented method of claim 1, further comprising evaluating the trained model by using an institutional set of data that includes a supplemental plurality of frames each including a visual indication of the presence of a hemorrhage.

13. The computer-implemented method of claim 1, further comprising removing a visual indication of a skull in each of the second plurality of frames.

14. The computer-implemented method of claim 1, further comprising removing a visual indication of a face in each of the second plurality of frames.

15. One or more tangible, non-transitory computer-readable media including instructions that, when executed by a processor, cause the processor to perform the computer-implemented method of claim 1.

* * * * *